UNITED STATES PATENT OFFICE.

DALLTOR KOLLE, OF RIPON, WISCONSIN, ASSIGNOR OF ONE-HALF HIS RIGHT TO JOHN F. PETERSON, OF SAME PLACE.

IMPROVEMENT IN COMPOSITIONS FOR IMITATING MARBLE.

Specification forming part of Letters Patent No. 151,889, dated June 9, 1874; application filed March 14, 1874.

*To all whom it may concern:*

Be it known that I, DALLTOR KOLLE, of Ripon, in the county of Fond du Lac and State of Wisconsin, have invented a new and Improved Composition for Coating Wood or other surfaces, Imitating Marble, &c.; and I do hereby declare the following to be a full, clear, and exact description of the same, which will enable others skilled in the art to which it appertains, or to which it is most closely connected, to make and apply the same.

This invention has for its object to provide a composition for coating wooden surfaces in imitation of marble, which shall be cheap, durable, ornamental, easily applied, and capable of resisting the action of acids or oils without being stained or otherwise injured. To this end, the invention consists in the composition of paris white, and various mineral colors, prepared and applied as I will now proceed to describe.

I take paris white, chrome yellow, ultramarine blue, and vermillion red, put each in a separate vessel, and grind finely in warm water, using as small a quantity of the latter as possible. I then take a mixture of warm water, glue, and alum-water, with which I dilute each ingredient until it becomes sufficiently thin to flow slightly, taking care to keep the whole in a warm state. I next pour a quantity of each compound thus formed on the surface to be ornamented, and with a fine stick mix the whole until the different colors assume such relative positions as to produce the desired marbled appearance. The composition is now allowed to dry and harden for four or five hours, after which linseed-oil is applied to the surface and allowed to dry in. The surface is next ground with sand-paper, and made smooth with pumice-stone, when it is ready to be finished by any of the well-known means.

I do not desire to confine myself to the precise number of coloring ingredients named, as it is obvious that to produce different effects different colors must be employed—for instance, a white ground with a dark vein is produced by using paris white and a small quantity of ultramarine. The essential feature of my invention, therefore, is the use of paris white and mineral colors, comminuted separately in warm water, mixed, while separated, with warm water, glue, and alum-water, and afterward commingled, to produce a marbled surface.

The composition thus formed is cheap, durable, and ornamental, and can be applied to wooden surfaces, panels, &c., or run in molds.

I claim as my invention—

The composition for covering surfaces of wood, &c., in imitation of marble, consisting essentially of the combination, with paris white, of chrome yellow, ultramarine blue, and vermillion red, or other suitable mineral colors, prepared as hereinbefore described—that is to say, comminuted separately in warm water, and mixed, while separate, with warm water, glue, and alum-water, and afterward commingled, substantially as and for the purpose above set forth.

DALLTOR KOLLE.

Witnesses:
 THOS. HARRIS,
 HARRY DE VERE.